US012204354B2

(12) United States Patent
Hunter

(10) Patent No.: US 12,204,354 B2
(45) Date of Patent: Jan. 21, 2025

(54) CASCODE VOLTAGE REGULATOR CIRCUIT

(71) Applicant: Texas Instruments Incorporated, Dallas, TX (US)

(72) Inventor: Bradford Hunter, Spicewood, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/305,960

(22) Filed: Apr. 24, 2023

(65) Prior Publication Data

US 2024/0353880 A1 Oct. 24, 2024

(51) Int. Cl.
*G05F 1/46* (2006.01)
*G05F 1/573* (2006.01)
*G05F 3/26* (2006.01)

(52) U.S. Cl.
CPC .............. *G05F 1/468* (2013.01); *G05F 1/573* (2013.01); *G05F 3/262* (2013.01)

(58) Field of Classification Search
None
See application file for complete search history.

(56) References Cited

U.S. PATENT DOCUMENTS 5,467,052 A * 11/1995 Tsukada .................... G05F 3/24 327/543
5,808,504 A * 9/1998 Chikai ............... H03K 17/0828 327/434
6,977,491 B1 12/2005 Caldwell
7,026,802 B2 * 4/2006 Gradinariu .............. G05F 1/575 323/316
7,688,051 B1 * 3/2010 Li ............................. G05F 1/56 323/280
7,737,676 B2 * 6/2010 Kimura ..................... G05F 1/56 323/315

(Continued)

FOREIGN PATENT DOCUMENTS

EP 3916943 B1 4/2024

OTHER PUBLICATIONS

BQ25170: 800-mA Linear Battery Charger for 1-Cell Li-Ion, and LiFePO4, Texas Instruments, Apr. 2020.
International Search Report mailed Aug. 30, 2024.

*Primary Examiner* — Thomas J. Hiltunen
(74) *Attorney, Agent, or Firm* — Charles F. Koch; Frank D. Cimino

(57) ABSTRACT

An example cascode voltage regulator circuit includes a first transistor coupled to an input voltage terminal and configured as a source follower to provide an output voltage at a source terminal, a second transistor coupled in series between the source terminal of the first transistor and an output terminal, the second transistor configured as a current limiter, and a current mirror coupled between respective first and second control terminals of the first and second transistors, the current mirror configured to receive a first current indicative of a source follower current flowing through the first transistor and to turn off the second transistor by coupling the first and second control terminals together responsive to the source follower current exceeding a threshold. In an example, the first transistor is a drain-extended NMOS device and the second transistor is a drain-extended PMOS device.

24 Claims, 5 Drawing Sheets

(56) References Cited

U.S. PATENT DOCUMENTS

| | | | | |
|---|---|---|---|---|
| 8,072,329 | B1 * | 12/2011 | Srinivas | G06K 19/07749 455/343.1 |
| 8,391,028 | B2 * | 3/2013 | Yeh | H02M 3/33507 363/21.13 |
| 9,019,005 | B2 * | 4/2015 | Feldtkeller | G05F 1/46 327/543 |
| 9,075,422 | B2 | 7/2015 | Vemula | |
| 9,081,404 | B2 * | 7/2015 | Jackum | G05F 1/56 |
| 9,547,324 | B2 * | 1/2017 | Vahid Far | G05F 1/575 |
| 9,759,781 | B2 * | 9/2017 | Ohtake | G01R 31/3835 |
| 2011/0080761 | A1 * | 4/2011 | Kung | H02M 7/219 363/127 |
| 2012/0262137 | A1 | 10/2012 | Arigliano | |
| 2013/0271095 | A1 | 10/2013 | Jackum | |
| 2017/0126130 | A1 | 5/2017 | Mayerl | |

* cited by examiner

CASCODE VOLTAGE REGULATOR CIRCUIT

TECHNICAL FIELD

This description relates to voltage regulation in circuits, and more particularly, to a cascode voltage regulator circuit.

BACKGROUND

Voltage regulator circuits are used in a wide variety of applications. Generally, transistors have a maximum allowable input voltage limit that is dictated by the maximum drain to source voltage that can be accommodated by the transistors without damage. However, there are some high voltage applications where a desired input voltage is beyond the technology limit of the transistors. This restricts circuit configurations that can be implemented and can limit the ability to design and apply voltage regulator circuits in certain applications. Accordingly, a number of non-trivial issues remain with developing voltage regulator circuits.

SUMMARY

According to one example, a cascode voltage regulator circuit, comprises: a first transistor having a first current terminal, a second current terminal, and a first control terminal, the first current terminal being coupled to an input voltage terminal; a second transistor coupled between the second current terminal of the first transistor and an output terminal, the second transistor having a second control terminal; a third transistor coupled between the second current terminal of the first transistor and the output terminal, the third transistor having a third control terminal coupled to the second control terminal of the second transistor; a fourth transistor coupled between the first and second control terminals and having a fourth control terminal; and a fifth transistor coupled between the first control terminal and the fourth control terminal and having a fifth control terminal coupled to the fourth control terminal.

According to another example, a cascode voltage regulator circuit comprises: a first transistor coupled to an input voltage terminal and configured as a source follower to provide an output voltage at a source terminal; a second transistor coupled in series between the source terminal of the first transistor and an output terminal, the second transistor configured as a current limiter; and a current mirror coupled between respective first and second control terminals of the first and second transistors, the current mirror configured to receive a first current indicative of a source follower current flowing through the first transistor and to turn off the second transistor by coupling the first and second control terminals together responsive to the source follower current exceeding a threshold.

According to another example, a cascode voltage regulator circuit comprises: a drain-extended n-channel metal oxide semiconductor (NMOS) transistor coupled to an input voltage terminal and having a first gate terminal; a drain-extended p-channel metal oxide semiconductor (PMOS) transistor coupled in series between a source terminal of the drain-extended NMOS transistor and an output terminal, and having a second gate terminal; a reference generator circuit having a first reference output terminal coupled to the first gate terminal of the drain-extended NMOS transistor and a second reference output terminal coupled to the second gate terminal of the drain-extended PMOS transistor, the reference generator circuit configured to provide a first control voltage at the first gate terminal and a second control voltage at the second gate terminal, the second control voltage being different from the first control voltage by an offset amount; a current mirror including a first transistor coupled between the first and second gate terminals and having a first control terminal, and a second transistor having a second control terminal coupled to the first control terminal; and a current sense circuit coupled to the source terminal of the drain-extended NMOS transistor, the second control terminal, and the output terminal, wherein the second transistor is coupled in series between the first gate terminal and the current sense circuit.

DETAILED DESCRIPTION

Figure 1:
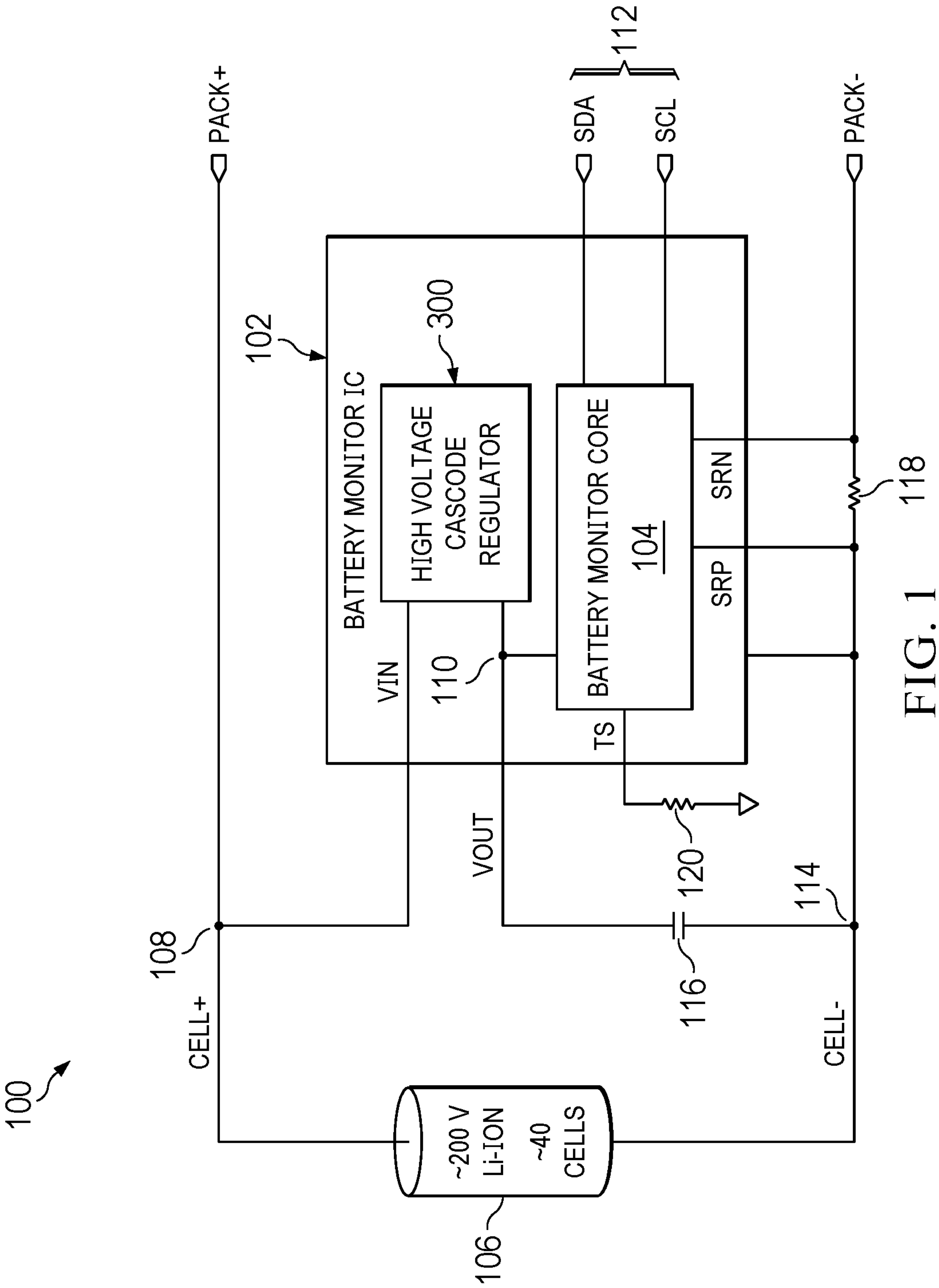
FIG. 1 is a block diagram of an electrical system that includes a cascode voltage regulator circuit, in an example.

Cascode voltage regulator circuitry is described. In some embodiments, a cascode voltage regulator circuit is configured with drain-extended transistors to accommodate higher input voltages, thereby making the circuit suitable for use in a wider range of applications and systems. In one such example, the cascode voltage regulator circuit includes a drain-extended n-channel metal oxide semiconductor (NMOS) transistor biased mid-voltage between two input voltage extremes (e.g., between a supply voltage and a reference voltage, such as ground) and configured as a source follower to provide a regulated output voltage. In some such examples, a drain-extended p-channel metal oxide semiconductor (PMOS) transistor is coupled in series with the source follower and configured to provide a current limiting function to protect the circuit. A current mirror can be coupled between the gates of the drain-extended NMOS and PMOS transistors, and can be configured to receive a current indicative of a source follower current flowing through the NMOS transistor and to turn off the PMOS transistor by coupling the gates of the drain-extended NMOS and PMOS transistors together responsive to the source follower current exceeding a threshold. In some such examples, the cascode voltage regulator circuit can include a current sensing circuit that is configured to provide the current indicative of a source follower current. A low-power reference generator circuit can be configured to supply offset bias voltages to the gates of the NMOS and PMOS drain-extended transistors.

General Overview

As described above, a number of non-trivial issues are associated with developing a voltage regulator circuit. For example, there are applications where the desired input voltage is above the maximum allowable input voltage limit set by the maximum drain to source voltage of the transistors used in the circuit. Drain-extended transistors offer an asymmetric voltage increase by allowing the voltage in the drain region to be substantially higher than in the gate, source or body regions. Drain-extended transistors can be fundamentally limited by an n-well (body or drain) to p-well (body or drain) breakdown voltage. However, these devices can tolerate higher input voltages because the outer n-well to p-substrate breakdown voltage can be substantially higher than the drain to source voltage, as described further below.

Accordingly, voltage regulator circuits are described herein that may be configured with a cascode configuration and drain-extended transistors, to accommodate higher input voltages. As described further below, certain embodiments provide an open-loop cascode circuit that includes robust current limiting for short circuit protection. Some examples include a low-power (e.g., less than 1 microampere (μA) current consumption under normal operating conditions) reference generator circuit that provides control voltages for the cascode circuit, while also offering an auxiliary output voltage than can be used for various internal functions (e.g., controller power or biasing).

Electronic System

Some examples of the cascode voltage regulator circuit described herein can be used in any electronic system with a power source that has a voltage beyond the transistor technology breakdown limit (e.g., above the maximum drain to source voltage limit for the transistors) but within the technology n-well breakdown voltage limit, such that it can be handled using drain-extended transistors. An example includes high voltage battery monitoring applications in which the battery pack to be monitored includes a large stack of series-connected battery cells. In such applications, the voltage across the battery pack can be significantly higher than the transistor technology breakdown limit (e.g., tens to hundreds of volts higher). Accordingly, one possible approach is to use multiple monitoring circuits to effectively "divide" the battery pack into smaller sub-units such that the voltage could be reduced to levels that can be handled by the transistors. This approach adds relatively complex circuitry and associated cost, which may be undesirable. In contrast, a cascode voltage regulator circuit described herein can operate in high voltage applications, enabling higher levels of integration to be achieved, with relatively lower complexity and cost.

FIG. 1 illustrates an example electronic system 100 for a battery monitoring application in which a high voltage cascode regulator 300 according to an example described herein may be advantageously used. In the example of FIG. 1, the electronic system 100 includes a battery monitor integrated circuit (IC) 102 that includes a battery monitor core/circuit 104 and a high voltage cascode regulator circuit 300. In some embodiments, the battery monitor IC 102 is coupled to a battery pack 106, which includes a plurality of battery cells coupled together in series. In another example, the battery pack 106 may be integrated within the IC 102. The battery cells may be, for example, lithium-ion battery cells, although any battery technology may be used. The battery pack 106 may include any number of battery cells. In one example, the battery pack 106 includes approximately 40 battery cells. The battery pack 106 may be a part of the electronic system 100 or may be coupled to electronic system 100. In some cases, electronic system 100 is implemented as a system-on-chip, or a chip set populated on a printed circuit board (PCB) which may in turn be populated into a chassis of a multi-chassis system or an otherwise higher-level system, although any number of implementations can be used. Although the term system is used, other terms may equally apply, such as device or apparatus.

As shown in FIG. 1, the cascode voltage regulator circuit 300 is coupled to an input voltage terminal 108 and receives an input voltage, $V_{IN}$. In some examples, the input voltage, $V_{IN}$, is a relatively high voltage, such as approximately 20V or 200V or higher, depending on the application. The cascode voltage regulator circuit 300 provides a regulated output voltage, $V_{OUT}$, at an output terminal 110, as described in more detail below. The battery monitor circuit 104 is coupled to the output terminal to receive the regulated output voltage, $V_{OUT}$, as shown. The battery monitor circuit 104 may include one or more sensor terminals, such as terminals TS, SRP, and SRN, shown in FIG. 1, that are used to monitor various characteristics of the battery pack 106, such as temperature, voltage, and/or charge, for example. In the illustrated example, terminals SRP and SRN are terminals across which a sense resistor 118 is coupled, such that SRP is sense resistor positive (for the more positive voltage), and SRN is sense resistor negative (for the more negative voltage). Terminal TS is a temperature qualification voltage input that senses a voltage generated by an external thermistor 120. The battery monitor circuit 104 may receive one or more control signals and/or provide one or more measurement output signals via communications terminal(s) 112 (e.g., SDA and SCL in the example shown in FIG. 1, although any number of data interfaces may be used). In the illustrated example, SCL and SDA are related to the I2C communication protocol I2C, with SCL referring to the clock line used to synchronize data transfer over the I2C bus, and SDA being the data line.

In some examples, the output terminal 110 is coupled to a reference voltage terminal 114 (e.g., ground) via an external (e.g., not part of the battery monitor IC 102) capacitor 116. In some applications, this capacitor 116 has a very large capacitance (e.g., on the order of 1 μF or larger). As a result, this capacitor 116 can expose the cascode voltage regulator circuit 300 to a possible short to ground fault or a large in-rush current start-up condition. Accordingly, as described in more detail below, some embodiments of the cascode voltage regulator circuit include a current limiter to protect the circuit against such conditions.

Cascode Voltage Regulator Circuit

Figure 2:
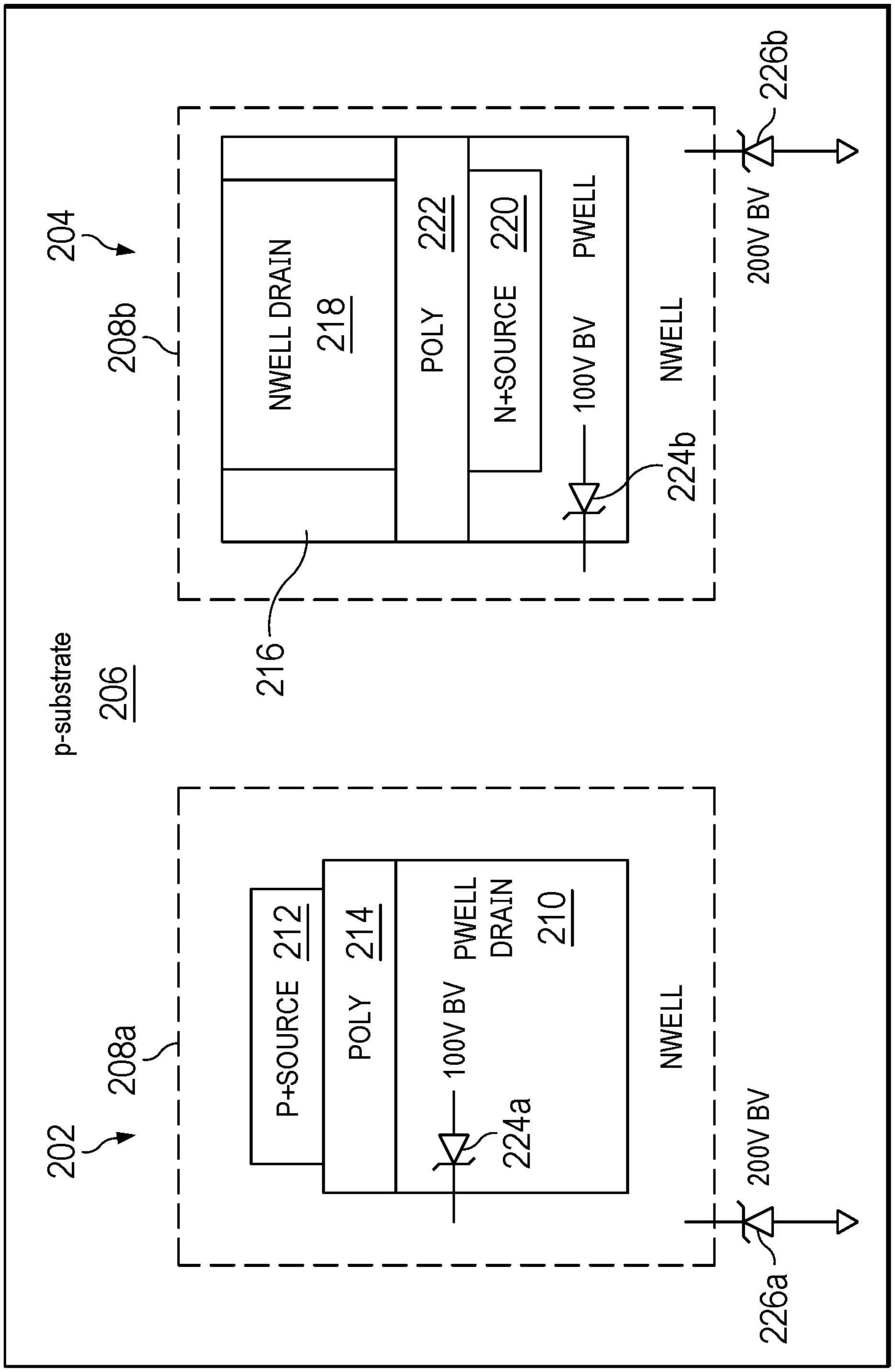
FIG. 2 is a plan view showing drain-extended transistor configurations, in an example.

As described above, some embodiments of the cascode voltage regulator circuit described herein are configured with drain-extended metal oxide semiconductor (MOS) devices to extend allowable the input voltage range. FIG. 2 illustrates example implementations of a drain-extended PMOS device 202 and a drain-extended NMOS device 204 in a p-doped silicon substrate 206. Both devices include an n-well region 208 (individually identified as 208*a* and 208*b*) formed in the substrate 206. The PMOS device 202 includes a p-well drain 210 and a positive p-doped (P+) source 212 separated by a polysilicon (gate electrode) region 214. The NMOS device includes a p-well region 216. An n-well drain 218 and positive n-doped (N+) source 220 are formed on the p-well region 216 and separated by a polysilicon (gate electrode) region 222. In still other examples, the gate electrodes may be implemented with electrode materials other than polysilicon. A gate dielectric provisioned between the gate electrode and channel region may be, for example, a native oxide of the channel region semiconductor material (e.g., a silicon channel region with a silicon dioxide gate dielectric and a polysilicon gate electrode). In each case, the n-well to p-well breakdown voltage, represented by Zener diodes 224*a*, 224*b*, is a first voltage level, $BV_T$, for example, 100 volts (V), which corresponds to the transistor technology breakdown limit described above. The outer n-well to p-substrate breakdown voltage, represented by Zener diodes 226*a*, 226*b*, is a second voltage level, $BV_{DE}$, that is much higher than $BV_T$, for example, on the order of 200V in some instances. Thus, certain embodiments of the cascode voltage regulator circuit 300 leverage this characteristic of drain-extended devices to allow the system in which it is used (such as the battery monitor IC 102, for example) to accommodate a higher maximum input voltage, $V_{IN}$, as described above.

Figure 3:
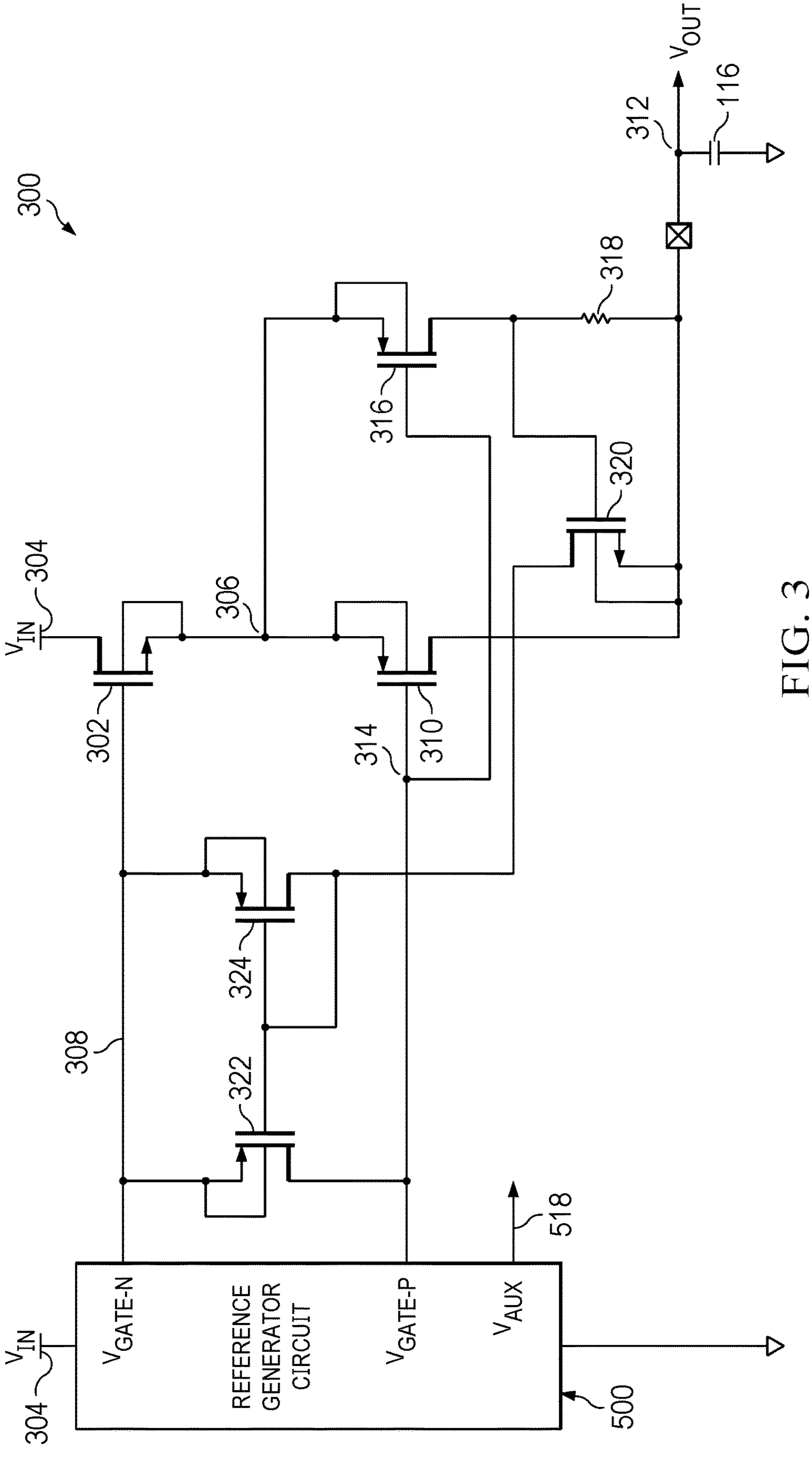
FIG. 3 is a schematic diagram of a cascode voltage regulator circuit, in an example.

FIG. 3 illustrates an example of the cascode voltage regulator circuit 300 that may be implemented using drain-extended transistors. The cascode voltage regulator circuit 300 includes a reference generator circuit 500 that provides two buffered control voltages, $V_{gate-n}$ and $V_{gate-p}$. Examples of the reference generator circuit 500 are described in more detail below with reference to FIG. 5. In the example of FIG. 3, the cascode voltage regulator circuit 300 includes a first transistor 302 coupled to an input supply voltage terminal 304. The first transistor 302 is configured as a cascode source follower and provides a regulated output voltage at its current terminal (e.g., source) 306. The first transistor 302 has a first control terminal (e.g., gate) 308 and is driven by the first buffered control voltage, $V_{gate-n}$, received at the first control terminal 308 from the reference generator circuit 500. A second transistor 310 is coupled in series with the first transistor 302 between the current terminal 306 of the first transistor 302 and an output voltage terminal 312 (which may correspond to the output terminal 110 in the example shown in FIG. 1). The second transistor 310 has a second control terminal (e.g., gate) 314 and is driven by the second buffered control voltage, $V_{gate-p}$, received at the second control terminal 314 from the reference generator circuit 500. As described below, the second control voltage, $V_{gate-p}$, may be offset from the first control voltage, $V_{gate-n}$, by a certain amount. For example, the second control voltage, $V_{gate-p}$, may be several volts lower than the first control voltage, $V_{gate-n}$. In certain examples, the second transistor 310 is configured to provide a current limiting function to protect the cascode voltage regulator circuit 300 against high current conditions, as described further below. In some such examples, the first transistor 302 is a drain-extended NMOS (DENMOS) transistor, and the second transistor 310 is a drain-extended PMOS (DEPMOS) transistor.

Figure 4:
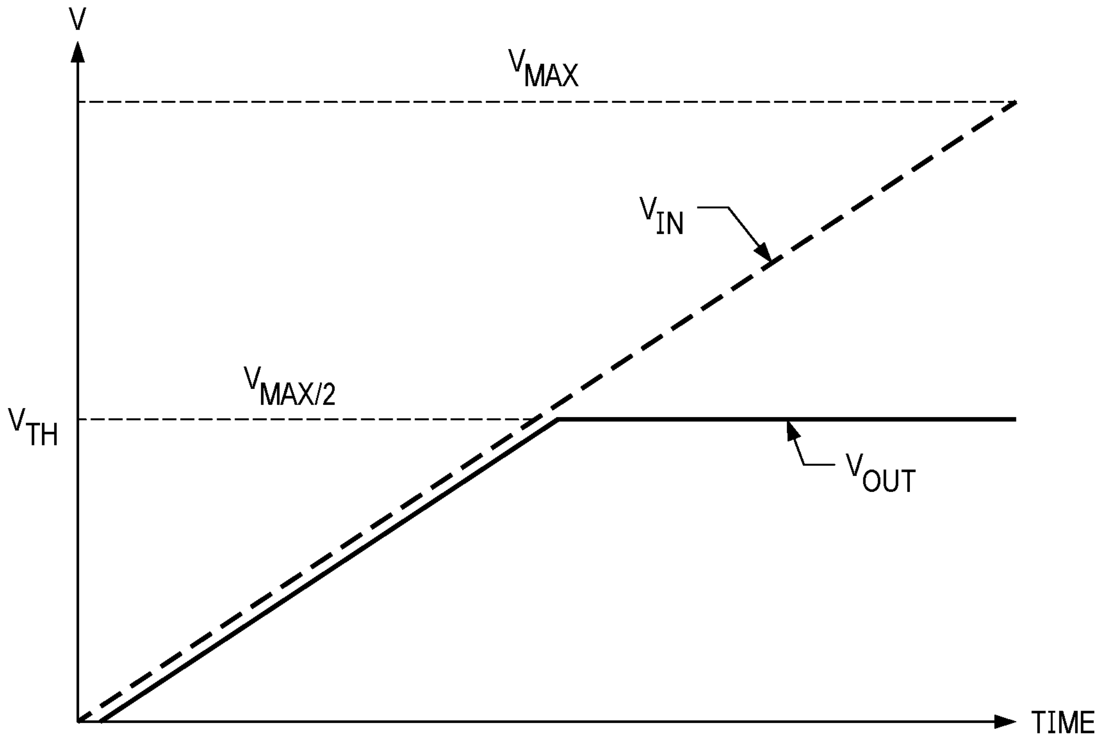
FIG. 4 is a graph showing voltage as a function of time, in an example.

Configured as a cascode source follower, the first transistor 302 provides a regulated output voltage, $V_{OUT}$, at the output voltage terminal 312. The regulated output voltage, $V_{OUT}$, corresponds generally to the voltage at the current terminal 306 of the first transistor 302, less any small losses that may occur through components in the circuit 300 between the current terminal 306 and the output voltage terminal 312. FIG. 4 is a graph showing an example of the regulated output voltage, $V_{OUT}$, relative to the input voltage, $V_{IN}$, at the input supply voltage terminal 304. As the input voltage, $V_{IN}$, rises, the output voltage, $V_{OUT}$, rises as well until it reaches a threshold voltage level, VTH, that is set by the control voltage, $V_{gate-n}$ applied at the control terminal 308 of the first transistor 302. The output voltage, $V_{OUT}$, then remains constant, even if the input voltage, $V_{IN}$, continues to rise, as shown in FIG. 4. Thus, the output voltage, $V_{OUT}$, is regulated at the threshold level, VTH. The particular value of the threshold level, VTH, may be set as needed by the reference generator circuit 500 and may be selected based on the application in which the cascode voltage regulator circuit 300 is to be used.

In some examples, the first transistor 302 is biased midway between the supply voltage ($V_{IN}$) at the input supply voltage terminal 304 and a reference voltage level, such as ground, for example. Accordingly, the output voltage, $V_{OUT}$, is regulated at approximately half the input supply voltage, $V_{IN}$, in such cases. However, in other examples, the first transistor 302 may be biased differently to set the output voltage, $V_{OUT}$, at some other level. As discussed above, using drain-extended transistor technology, relatively high input supply voltage levels can be accommodated by the cascode voltage regulator circuit 300. In one example in which the first transistor 302 is a DENMOS transistor, the first transistor 302 can be biased and the circuitry configured such that the maximum input voltage, $V_{MAX}$, cannot exceed twice the maximum allowable drain-to-source voltage of the first transistor 302. However, in other examples, the maximum input voltage, $V_{MAX}$, can be more or less than twice the maximum allowable drain-to-source voltage.

Figure 5:
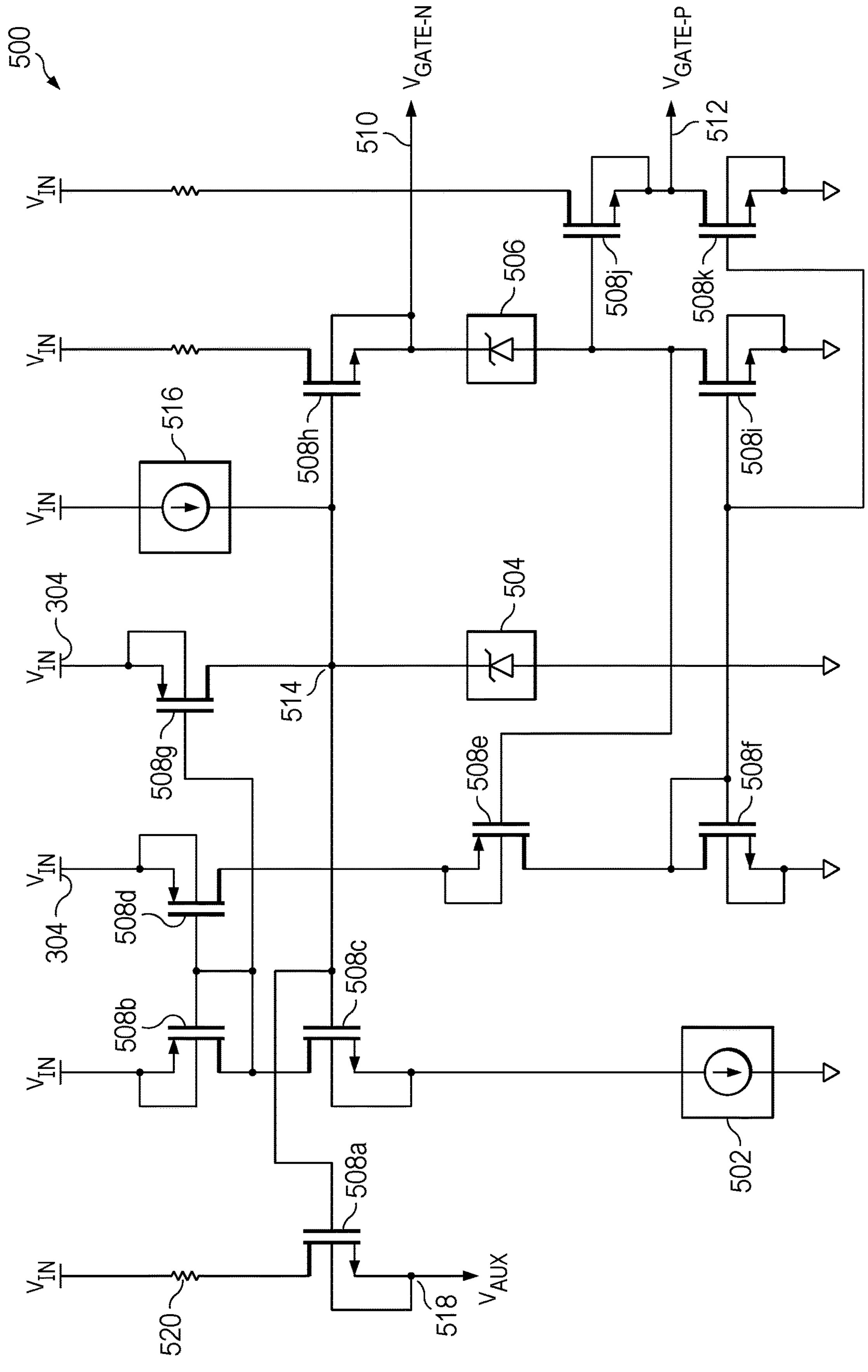
FIG. 5 is a schematic diagram of a reference generator circuit, in an example.

Referring to FIG. 5, there is illustrated an example of the reference generator circuit 500 according to certain aspects. In this example, the reference generator circuit 500 includes a current source 502 configured to generate a reference current that is used to provide a reference voltage. The reference generator circuit 500 can be configured to set the reference voltage at a particular selected level, such that the reference generator circuit 500 produces a stable reference voltage at the selected level that can be used by downstream circuitry regardless of the value of the input voltage, $V_{IN}$. In one example, the current source 502 is implemented using a depletion mode transistor. A depletion mode transistor, built in a native substrate without doping applied, is naturally always ON, and a negative applied voltage is used to turn it OFF. Accordingly, using a depletion mode transistor with its gate connected to its source provides a convenient implementation for the current source 502 that does not require additional circuitry. However, in other examples, other implementations may be used.

In one example, to produce the reference voltage, the reference generator circuit 500 includes a breakdown diode 504, such as a Zener diode, for example. The breakdown diode 504 may include a single Zener diode or a stack of two or more Zener diodes, for example. The breakdown diode 504 produces the reference voltage based on the reference current supplied by the current source 502. As discussed above, the reference generator circuit 500 produces the two buffered control voltages, $V_{gate-n}$ and $V_{gate-p}$, at first and second reference output terminals 510 and 512, respectively. In one example, the control voltage $V_{gate-n}$ corresponds to the reference voltage level produced by the breakdown diode 504, and the control voltage $V_{gate-p}$ corresponds to a voltage level slightly offset from the reference voltage level, as discussed above. Accordingly, the reference generator circuit 500 includes an offset element 506 configured to produce a small drop in the reference voltage level to generate the control voltage $V_{gate-p}$. In one example, the offset element is a Zener diode, although other voltage drop elements may be used in other examples. In one example, in which the input voltage, $V_{IN}$ is 200V, as discussed above, the reference voltage generated by the reference generator circuit 500 may be 100V, for example, and the voltage drop produced by the offset element 506 may be 5V, for example; however, in other examples, the voltage values can be different.

The reference generator circuit 500 includes a plurality of transistors 508 (identified individually as transistors 508*a-k*) that serve various functions within the circuit. The transistor 508*c* operates to protect the current source 502. As shown in FIG. 5, the transistor 508*c* has its gate coupled to a terminal 514 of the breakdown diode 504 at which the reference voltage is produced. Accordingly, the transistor 508*c* operates to ensure that the current source 502 is not exposed to a voltage level higher than the reference voltage. In one example, the transistor 508*c* is a depletion mode transistor.

The transistors 508*b* and 508*d* are coupled together in a current mirror configuration. Similarly, the transistors 508*f* and 508*i* are coupled together in a current mirror configuration. In some examples, the transistors 508 are implemented as drain-extended transistors.

In some examples, a feedback loop can be created in the reference generator circuit 500 because the current source 502 provides the reference voltage level that is used to provide the current that goes through the breakdown diode 504 to provide the reference voltage that is then fed back to the gate of the transistor 508*c* to protect the current source 502, as discussed above. Accordingly, under conditions where the reference voltage level is 0V (or close to 0V) and the input voltage $V_{IN}$ is non-zero (e.g., 200V in the example discussed above), the current source 502 is cut off and does not produce current. In this situation, there is no reference current suppled to the current mirrors, such that the reference generator circuit 500 could become self-locked. To prevent this condition, in one example, the reference generator circuit 500 includes a leaky start-up element 516 that operates to ensure that, should the terminal 510 become grounded (e.g., at 0V), there is a leakage path through the leaky start-up element 516 from the supply voltage terminal 304 to start pulling the terminal 514 upward in voltage and re-activate the circuit.

Referring again to FIG. 3, in certain examples, the first transistor 302 and the second transistor 310 are large power transistors that are capable of providing high output current to drive downstream circuitry for the application in which the cascode voltage regulator circuit 300 is used. For example, in the system 100 of FIG. 1, the first transistor 302 may be capable of supplying the current needed to run the battery monitor core 104 and/or any other circuitry on the battery monitor integrated circuit 102 based on the reference voltage supplied by the reference generator circuit 500. For example, the first transistor 302 may be capable of supplying up to 50 milliamps (or higher) of current based on a 100V reference voltage. In contrast, examples of the reference generator circuit 500 are configured have very low quiescent current (low IQ), for example, on the order of 1 microamp, or even nanoamps. Thus, in operation, the first transistor 302 may be supplying an output current that is higher by 50,000 times or more than the operating current of the reference generator circuit 500. In addition, in these examples in which the first and second transistors 302, 310 are large power transistors, they may present a very large gate capacitance to the reference generator circuit 500. As a result, any transients in the voltages and/or currents at the gates of the first and second transistors 302, 310 could cause coupling into the reference generator circuit 500, which would destabilize the reference voltage and could damage the reference generator circuit 500.

To address this potential concern, examples of the reference generator circuit 500 include output stage components to protect reference generator circuit 500. In particular, referring again to FIG. 5, the reference generator circuit 500 includes the transistors 508*h* and 508*j* configured as source followers to act as buffer elements for the first and second reference output terminals 510 and 512. As shown in FIG. 5, the transistor 508*h* is coupled between the input voltage terminal 304 and the first reference output terminal 510, with its control terminal coupled to the breakdown diode 504 (at the terminal 514) and provides a buffer element for the first reference output terminal 510. Transistor 508*j* is coupled between the input voltage terminal 304 and the second reference output terminal 512, with its control terminal coupled to the offset element 506, and provides a buffer element for the second reference output terminal 512. Thus, the reference generator circuit 500 provides the control voltages $V_{gate-n}$ and $V_{gate-p}$ as buffered control voltages.

Referring again to FIG. 3, as described above, in some applications, the output voltage terminal 312 of the cascode voltage regulator circuit 300 can be coupled to a large external capacitor 116. The presence of this capacitor 116 can expose the first transistor 302 to a possible short to ground fault or large in-rush current start-up condition, as described above. In other applications and/or configurations of a system in which the cascode voltage regulator circuit 300 is used, other conditions or devices or circuitry may similarly pose a high current risk to the first transistor 302. Accordingly, certain examples of the cascode voltage regulator circuit 300 include current limiting functionality. In particular, as described above, in certain examples, the second transistor 310 is coupled to the first transistor 302 and configured to act as a current limiter to protect the first transistor 302.

According to certain examples, current through the second transistor 310 (and therefore through the first transistor 302) is monitored using a current sensing circuit. In the example illustrated in FIG. 3, the current sense circuit includes a third transistor 316, connected in parallel with the second transistor 310, a sense resistor 318, and a fourth transistor 320. As shown in FIG. 3, the third transistor has a first current terminal coupled to the current terminal 306 of the first transistor 302, and a control terminal coupled to the control terminal 314 of the second transistor 310. The sense resistor 318 is coupled in series between a second current terminal of the third transistor 316 and the output voltage terminal 312. The third transistor 318 senses the source follower current (e.g., the current flowing through the second transistor 310, and therefore through the first transistor 302). The sensed current is dropped across the sense resistor 318 and driven into a current mirror (implemented using fifth and sixth transistors 322, 324) through the fourth transistor 320 that is coupled to the output voltage terminal 312, as shown in FIG. 3. In some examples, the fourth transistor 320 is a DENMOS transistor. The current mirror limits the output current from the second transistor 310 (and thus the current flowing through the first transistor 302) dynamically through a feedback loop to provide robust current regulation for the first transistor 302.

Therefore, in the example of FIG. 3, the fifth transistor 322 and the sixth transistor 324 are configured in a current mirror arrangement in which the gates of the transistors 322 and 324 are coupled together, the source terminals of the transistors 322 and 324 are coupled together, and the drain terminal of the sixth transistor 324 is coupled to the gates of both transistors 322, 324. As described above, in some examples, the two control voltages, $V_{gate-n}$, and $V_{gate-p}$, output from the reference generator circuit 500 are offset from one another by a certain amount, for example, a few volts (e.g., 5V), thus providing a differential between the control terminals of the first and second transistors 302, 310. When the sense current dropped across the resistor 318 reaches a threshold corresponding to a threshold voltage of the fourth transistor 320, a current path is activated to the control terminals of the transistors 322, 324. As a result, the current mirror turns ON and pulls the voltage (V gate-p) at the control terminal 314 of second transistor 310 upwards to the equalize it with the voltage ($V_{gate-n}$) at the control terminal 308 of the first transistor 302, thereby turning OFF the second transistor 310 and limiting the current.

Thus, aspects and examples provide a compact cascode voltage regulator circuit that leverages drain-extended transistor technology to handle high voltage applications. The first transistor 302 provides voltage regulation, as discussed above, while the second transistor 310 provides robust current regulation in combination with the current mirror and the current sense circuit. As described above, in some examples, the first and second transistors 302, 310 are large power transistors capable of handling not only high input voltages but also high current loads. Accordingly, the first and second transistors 302, 310 may have a size (described by the transistor width-to-length ratio, W/L) that is several times, even many times, greater than the W/L of the transistors 316, 322, 324. For example, the transistors 316, 322, 324 may have a size W/L=1, whereas the first and second transistors 302, 310 have a size W/L=X, where X is a value greater than 1. In this case, the current limit, $I_{limit}$, at which the current mirror will turn off the second transistor 310 is given by:

$$I_{limit} = \frac{X * Vth_{Ms}}{R_s}$$

where $Vth_{Ms}$ is the threshold voltage of the transistor 320 and $R_s$ is the resistance value of the sense resistor 318.

In some examples in which the regulated voltage provided by the first transistor 302 is high (e.g., 100V), in the case of a short on the output terminal 312, or other fault condition, even though the current is limited as discussed above, the power (wattage) experienced by the circuit 300 can be high. If the fault condition persists for some time, this high wattage can cause the circuit 300, and potentially the integrated circuit (e.g., the battery monitor IC 302) in which it is implemented, to heat up, potentially to temperatures that could damage or even destroy components of the circuit 300 or the chip in which it is implemented. Accordingly, certain examples provide an auxiliary output that can remain operational even if the case of a fault on the output terminal 312 and provide an auxiliary voltage (VAUX) that can be used to operate a temperature sensor, for example, or other circuitry that can trigger an alarm when a fault condition occurs.

Referring again to FIG. 5, in some examples, the reference generator circuit 500 includes a third reference output terminal 518 at which the auxiliary output voltage, VAUX, is provided. In one example, the auxiliary output voltage, VAUX, is a buffered output voltage and corresponds generally to the reference voltage produced by the breakdown diode 504. The transistor 508*a* is configured as a source follower to act as a buffer element for the third reference output terminal 518. As shown, the transistor 508*a* is coupled in series between the input voltage terminal 304 and the third reference output terminal 518, and has a control terminal coupled to the terminal 514 of the breakdown diode 504. Current limiting for the auxiliary voltage, VAUX, is provided by the resistor 520 that is coupled in series between the input voltage terminal 304 and the transistor 508*a*, as shown. In some examples, the auxiliary voltage, VAUX, can be used to supply a temperature sensor or bandgap reference, for example, that could be used to deactivate the circuit 300 in the case of a fault condition. In other examples, however, the auxiliary voltage, VAUX, could be used to supply a wide variety of other low IQ circuitry. The auxiliary voltage, VAUX, provides a power source for other active circuitry when there is a short or other fault on the output terminal 312, or may be used to supply various components or circuitry via an additional path even when there is no fault condition associated with the output terminal 312.

FURTHER EXAMPLES

Example 1 is a cascode voltage regulator circuit, comprising a first transistor having a first current terminal, a second current terminal, and a first control terminal, the first current terminal being coupled to an input voltage terminal, a second transistor coupled between the second current terminal of the first transistor and an output terminal, the second transistor having a second control terminal, a third transistor coupled between the second current terminal of the first transistor and the output terminal, the third transistor having a third control terminal coupled to the second control terminal of the second transistor, a fourth transistor coupled between the first and second control terminals and having a fourth control terminal, and a fifth transistor coupled between the first control terminal and the fourth control terminal and having a fifth control terminal coupled to the fourth control terminal.

Example 2 includes the cascode voltage regulator circuit of Example 1, wherein the first transistor is a drain-extended n-channel metal oxide semiconductor (NMOS) transistor, and wherein the second transistor is a drain-extended p-channel metal oxide semiconductor (PMOS) transistor.

Example 3 includes the cascode voltage regulator circuit of one of Examples 1 and 2, further comprising a resistor having a first resistor terminal coupled to the output terminal and a second resistor terminal coupled to the third transistor such that the third transistor is coupled between the second current terminal of the first transistor and the second resistor terminal.

Example 4 includes the cascode voltage regulator circuit of Example 3, further comprising a sixth transistor coupled between the fourth control terminal and the output terminal and having a sixth control terminal coupled to the second resistor terminal.

Example 5 includes the cascode voltage regulator circuit of any one of Examples 1-4, further comprising a reference generator circuit having a first reference output coupled to the first control terminal of the first transistor and a second reference output coupled to the second control terminal of the second transistor.

Example 6 includes the cascode voltage regulator circuit of Example 5, wherein the reference generator circuit is configured to provide a first control voltage to the first control terminal of the first transistor and a second control voltage to the second control terminal of the second transistor, wherein the first control voltage is approximately half an input voltage applied at the input voltage terminal, and wherein the first transistor is configured to provide an output voltage at the second current terminal, the output voltage being approximately equal to the first control voltage.

Example 7 includes the cascode voltage regulator circuit of Example 6, wherein the second control voltage differs from the first control voltage by an offset amount.

Example 8 includes the cascode voltage regulator circuit of any one of Examples 5-7, wherein the reference generator circuit includes a current source coupled to the input voltage terminal and a breakdown diode coupled to the current source, the breakdown diode configured to produce a reference voltage based on a reference current supplied by the current source.

Example 9 includes the cascode voltage regulator circuit of Example 8, wherein the breakdown diode is a Zener diode.

Example 10 includes the cascode voltage regulator circuit of one of Examples 8 and 9, wherein the reference generator circuit further includes an offset element coupled between the first and second reference outputs.

Example 11 includes the cascode voltage regulator circuit of any one of Examples 8-10, wherein the reference generator circuit further includes a leaky start-up element coupled between the input voltage terminal and the breakdown diode.

Example 12 includes the cascode voltage regulator circuit of any one of Examples 1-11, wherein the first and second transistors are complementary transistors.

Example 13 provides an integrated circuit comprising the cascode voltage regulator circuit of any one of Examples 1-12, and a battery monitoring circuit coupled to the output terminal of the cascode voltage regulator circuit.

Example 14 includes the integrated circuit of Example 13, further comprising at least one sensor terminal, and at least one communications terminal, wherein the battery monitoring circuit is coupled to the at least one sensor terminal and to the at least one communications terminal.

Example 15 includes the integrated circuit of Example 14, wherein the at least one sensor terminal includes a temperature sensing terminal coupled to the battery monitoring circuit.

Example 16 provides a cascode voltage regulator circuit comprising a first transistor coupled to an input voltage terminal and configured as a source follower to provide an output voltage at a source terminal, a second transistor coupled in series between the source terminal of the first transistor and an output terminal, the second transistor configured as a current limiter, and a current mirror coupled between respective first and second control terminals of the first and second transistors, the current mirror configured to receive a first current indicative of a source follower current flowing through the first transistor and to turn off the second transistor by coupling the first and second control terminals together responsive to the source follower current exceeding a threshold.

Example 17 includes the cascode voltage regulator circuit of Example 16, wherein, in operation, the first transistor is biased mid-voltage between an input voltage at the input voltage terminal and a reference voltage.

Example 18 includes the cascode voltage regulator circuit of one of Examples 16 and 17, wherein the first transistor is a drain-extended n-channel metal oxide semiconductor (NMOS) transistor, and wherein the second transistor is a drain-extended p-channel metal oxide semiconductor (PMOS) transistor.

Example 19 includes the cascode voltage regulator circuit of any one of Examples 16-18, further comprising a current sense circuit coupled to the source terminal of the first transistor, to the control terminal of the second transistor, and to the current mirror, the current sense circuit configured to provide the first current to the current mirror.

Example 20 includes the cascode voltage regulator circuit of Example 19, wherein the current mirror comprises a third transistor coupled between the first and second control terminals and having a third control terminal, and a fourth transistor coupled between the first control terminal and the current sense circuit, and having a fourth control terminal coupled to the third control terminal.

Example 21 includes the cascode voltage regulator circuit of Example 20, wherein the current sense circuit comprises a fifth transistor coupled to the source terminal of the first transistor and having a fifth control terminal coupled to the second control terminal of the second transistor, a resistor having first and second resistor terminals, the first resistor terminal being coupled to the fifth transistor such that the fifth transistor is coupled in series between the source terminal of the first transistor and the first resistor terminal, and the second resistor terminal being coupled to the output terminal, and a sixth transistor coupled between the fourth control terminal of the fourth transistor and the second resistor terminal, the sixth transistor having a sixth control terminal coupled to the first resistor terminal.

Example 22 includes the cascode voltage regulator circuit of Example 21, wherein the first, second, third, fourth, fifth, and sixth transistors are drain-extended field effect transistors (FETs).

Example 23 includes the cascode voltage regulator circuit of one of Examples 21 and 22, wherein the sixth transistor is a drain-extended n-channel metal oxide semiconductor (NMOS) transistor.

Example 24 includes the cascode voltage regulator circuit of any one of Examples 16-23, further comprising a reference generator circuit coupled to the current mirror, the reference generator circuit having a first reference output terminal coupled to the first control terminal of the first transistor and a second reference output terminal coupled to the second control terminal of the second transistor.

Example 25 includes the cascode voltage regulator circuit of Example 24, wherein the reference generator circuit is configured to provide a first control voltage at the first control terminal of the first transistor and a second control voltage at the second control terminal of the second transistor, wherein the first control voltage is approximately half the input voltage applied at the input voltage terminal, and wherein the second control voltage differs from the first control voltage by an offset amount.

Example 26 includes the cascode voltage regulator circuit of one of Examples 24 and 25, wherein the reference generator circuit includes a current source coupled to the input voltage terminal and a breakdown diode coupled to the current source, the breakdown diode configured to produce a reference voltage based on a reference current supplied by the current source.

Example 27 includes the cascode voltage regulator circuit of Example 26, wherein the breakdown diode is a Zener diode.

Example 28 includes the cascode voltage regulator circuit of one of Examples 25-27, wherein the reference generator circuit further includes an offset element configured to produce the offset amount between the first and second control voltages.

Example 29 includes the cascode voltage regulator circuit of any one of Examples 25-28, wherein the reference generator circuit further includes a leaky start-up element coupled between the input voltage terminal and the breakdown diode.

Example 30 provides an integrated circuit comprising the cascode voltage regulator circuit of any one of Examples 16-29, at least one sensor terminal, at least one communications terminal, and a battery monitoring circuit coupled to the output terminal of the cascode voltage regulator circuit, to the at least one sensor terminal, and to the at least one communications terminal.

Example 31 provides a cascode voltage regulator circuit comprising a drain-extended n-channel metal oxide semiconductor (NMOS) transistor coupled to an input voltage terminal and having a first gate terminal, and a drain-extended p-channel metal oxide semiconductor (PMOS) transistor coupled in series between a source terminal of the drain-extended NMOS transistor and an output terminal, and having a second gate terminal. The cascode voltage regulator circuit further comprises a reference generator circuit having a first reference output terminal coupled to the first gate terminal of the drain-extended NMOS transistor and a second reference output terminal coupled to the second gate terminal of the drain-extended PMOS transistor, the reference generator circuit configured to provide a first control voltage at the first gate terminal and a second control voltage at the second gate terminal, the second control voltage being different from the first control voltage by an offset amount, a current mirror including a first transistor coupled between the first and second gate terminals and having a first control terminal, and a second transistor having a second control terminal coupled to the first control terminal, and a current sense circuit coupled to the source terminal of the drain-extended NMOS transistor, the second control terminal, and the output terminal, wherein the second transistor is coupled in series between the first gate terminal and the current sense circuit.

Example 32 includes the cascode voltage regulator circuit of Example 31, wherein the current sense circuit comprises a resistor having a first resistor terminal coupled to the output terminal and a second resistor terminal, a third transistor coupled in series between the source terminal of the drain-extended NMOS transistor and the second resistor terminal, the third transistor having a third control terminal coupled to the second gate terminal of the drain-extended PMOS transistor, and a fourth transistor coupled between the second control terminal of the second transistor and the output terminal, and having a fourth control terminal coupled to the second resistor terminal.

Example 33 includes the cascode voltage regulator circuit of Example 32, wherein the first, second, and third transistors are drain-extended field effect transistors.

Example 34 includes the cascode voltage regulator circuit of one of Examples 32 and 33, wherein a first width-to-length ratio of the second transistor and a second width-to-length ratio of the third transistor are selected relative to one another to achieve a specified current sense to current regulation ratio.

Example 35 includes the cascode voltage regulator circuit of any one of Examples 31-34, wherein the reference generator circuit includes a current source coupled to the input voltage terminal and a breakdown diode coupled to the input voltage terminal and to the current source, wherein the breakdown diode is configured to provide a reference voltage based on a reference current supplied by the current source.

Example 36 includes the cascode voltage regulator circuit of Example 35, wherein the reference generator circuit further includes an offset element coupled between the first and reference output terminals.

Example 37 includes the cascode voltage regulator circuit of Example 36, wherein the breakdown diode and the offset element are Zener diodes.

Example 38 includes the cascode voltage regulator circuit of one of Examples 36 and 37, wherein the reference generator circuit includes a first buffer element coupled between the breakdown diode and the first reference output terminal, and a second buffer element coupled between the offset element and the second reference output terminal.

Example 39 provides an integrated circuit comprising the cascode voltage regulator circuit of any one of Examples 31-38, at least one sensor terminal, at least one communications terminal, and a battery monitoring circuit coupled to the output terminal of the cascode voltage regulator circuit, to the at least one sensor terminal, and to the at least one communications terminal.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end user and/or a third party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used (such as bipolar junction transistors (BJTs)). Furthermore, the devices may be implemented in/over a silicon substrate (Si), a silicon carbide substrate (SiC), a gallium nitride substrate (GaN) or a gallium arsenide substrate (GaAs). Moreover, reference to transistor features such as gate, source, or drain is not intended to exclude any suitable transistor technologies. For instance, features such as source, drain, and gate are typically used to refer to a FET, while emitter, collector, and base are typically used to refer to a BJT. Such features may be used interchangeably herein. For instance, reference to the gate of a transistor may refer to either the gate of a FET or the base of a BJT, and vice-versa. In some examples, a control terminal may refer to either the gate of a FET or the base of a BJT. Any other suitable transistor technologies can be used. Any such transistors can be used as a switch, with the gate or base or other comparable feature acting as a switch select input that can be driven to connect the source and drain (or the emitter and collector, as the case may be).

References herein to a field effect transistor (FET) being "ON" (or a switch being closed) means that the conduction channel of the FET is present, and drain current may flow through the FET. References herein to a FET being "OFF" (or a switch being open) means that the conduction channel is not present, and drain current does not flow through the FET. A FET that is OFF, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described examples, and other examples are possible within the scope of the claims.

What is claimed is:

1. A cascode voltage regulator circuit, comprising:

a first transistor having a first current terminal, a second current terminal, and a first control terminal, the first current terminal being coupled to an input voltage terminal;

a second transistor coupled between the second current terminal of the first transistor and an output terminal, the second transistor having a second control terminal;

a third transistor coupled between the second current terminal of the first transistor and the output terminal, the third transistor having a third control terminal coupled to the second control terminal of the second transistor;

a fourth transistor coupled between the first and second control terminals and having a fourth control terminal; and a fifth transistor coupled between the first control terminal and the fourth control terminal and having a fifth control terminal coupled to the fourth control terminal, wherein the first and second transistors are complementary transistors.

2. The cascode voltage regulator circuit of claim 1, wherein the first transistor is a drain-extended n-channel metal oxide semiconductor (NMOS) transistor, and wherein the second transistor is a drain-extended p-channel metal oxide semiconductor (PMOS) transistor.

3. The cascode voltage regulator circuit of claim 1, further comprising:

a resistor having a first resistor terminal coupled to the output terminal and a second resistor terminal coupled to the third transistor such that the third transistor is coupled between the second current terminal of the first transistor and the second resistor terminal.

4. The cascode voltage regulator circuit of claim 3, further comprising:

a sixth transistor coupled between the fourth control terminal and the output terminal and having a sixth control terminal coupled to the second resistor terminal.

5. The cascode voltage regulator circuit of claim 1, further comprising:

a reference generator circuit having a first reference output coupled to the first control terminal of the first transistor and a second reference output coupled to the second control terminal of the second transistor.

6. The cascode voltage regulator circuit of claim 5, wherein the reference generator circuit is configured to provide a first control voltage to the first control terminal of the first transistor and a second control voltage to the second control terminal of the second transistor;

wherein the first control voltage is approximately half an input voltage applied at the input voltage terminal; and wherein the first transistor is configured to provide an output voltage at the second current terminal, the output voltage being approximately equal to the first control voltage.

7. The cascode voltage regulator circuit of claim 6, wherein the second control voltage differs from the first control voltage by an offset amount.

8. An integrated circuit comprising:

the cascode voltage regulator circuit of claim 1; and a battery monitoring circuit coupled to the output terminal of the cascode voltage regulator circuit.

9. The integrated circuit of claim 8, further comprising:

at least one sensor terminal; and at least one communications terminal, wherein the battery monitoring circuit is coupled to the at least one sensor terminal and to the at least one communications terminal.

10. A cascode voltage regulator circuit comprising:

a first transistor coupled to an input voltage terminal and configured as a source follower to provide an output voltage at a source terminal;

a second transistor coupled in series between the source terminal of the first transistor and an output terminal, the second transistor configured as a current limiter; and a current mirror coupled between respective first and second control terminals of the first and second transistors, the current mirror configured to receive a first current indicative of a source follower current flowing through the first transistor and to turn off the second transistor by coupling the first and second control terminals together responsive to the source follower current exceeding a threshold.

11. The cascode voltage regulator circuit of claim 10, wherein, in operation, the first transistor is biased mid-voltage between an input voltage at the input voltage terminal and a reference voltage.

12. The cascode voltage regulator circuit of claim 10, wherein the first transistor is a drain-extended n-channel metal oxide semiconductor (NMOS) transistor, and wherein the second transistor is a drain-extended p-channel metal oxide semiconductor (PMOS) transistor.

13. The cascode voltage regulator circuit of claim 10, further comprising:

a current sense circuit coupled to the source terminal of the first transistor, to the control terminal of the second transistor, and to the current mirror, the current sense circuit configured to provide the first current to the current mirror.

14. The cascode voltage regulator circuit of claim 13, wherein the current mirror comprises:

a third transistor coupled between the first and second control terminals and having a third control terminal; and a fourth transistor coupled between the first control terminal and the current sense circuit, and having a fourth control terminal coupled to the third control terminal.

15. The cascode voltage regulator circuit of claim 14, wherein the current sense circuit comprises:

a fifth transistor coupled to the source terminal of the first transistor and having a fifth control terminal coupled to the second control terminal of the second transistor;

a resistor having first and second resistor terminals, the first resistor terminal being coupled to the fifth transistor such that the fifth transistor is coupled in series between the source terminal of the first transistor and the first resistor terminal, and the second resistor terminal being coupled to the output terminal; and a sixth transistor coupled between the fourth control terminal of the fourth transistor and the second resistor terminal, the sixth transistor having a sixth control terminal coupled to the first resistor terminal.

16. The cascode voltage regulator circuit of claim 15, wherein the first, second, third, fourth, fifth, and sixth transistors are drain-extended field effect transistors (FETs).

17. The cascode voltage regulator circuit of claim 16, wherein the first and sixth transistors are drain-extended n-channel metal oxide semiconductor (NMOS) transistors, and wherein the second transistor is a drain-extended p-channel metal oxide semiconductor (PMOS) transistor.

18. The cascode voltage regulator circuit of claim 10, further comprising:

a reference generator circuit coupled to the current mirror, the reference generator circuit having a first reference output terminal coupled to the first control terminal of the first transistor and a second reference output terminal coupled to the second control terminal of the second transistor.

19. The cascode voltage regulator circuit of claim 18, wherein the reference generator circuit is configured to provide a first control voltage at the first control terminal of the first transistor and a second control voltage at the second control terminal of the second transistor;

wherein the first control voltage is approximately half the input voltage applied at the input voltage terminal; and wherein the second control voltage differs from the first control voltage by an offset amount.

20. An integrated circuit comprising:

the cascode voltage regulator circuit of claim 10;

at least one sensor terminal;

at least one communications terminal; and a battery monitoring circuit coupled to the output terminal of the cascode voltage regulator circuit, to the at least one sensor terminal, and to the at least one communications terminal.

21. A cascode voltage regulator circuit comprising:

a drain-extended n-channel metal oxide semiconductor (NMOS) transistor coupled to an input voltage terminal and having a first gate terminal;

a drain-extended p-channel metal oxide semiconductor (PMOS) transistor coupled in series between a source terminal of the drain-extended NMOS transistor and an output terminal, and having a second gate terminal;

a reference generator circuit having a first reference output terminal coupled to the first gate terminal of the drain-extended NMOS transistor and a second reference output terminal coupled to the second gate terminal of the drain-extended PMOS transistor, the reference generator circuit configured to provide a first control voltage at the first gate terminal and a second control voltage at the second gate terminal, the second control voltage being different from the first control voltage by an offset amount;

a current mirror including a first transistor coupled between the first and second gate terminals and having a first control terminal, and a second transistor having a second control terminal coupled to the first control terminal; and a current sense circuit coupled to the source terminal of the drain-extended NMOS transistor, the second control terminal, and the output terminal, wherein the second transistor is coupled in series between the first gate terminal and the current sense circuit.

22. The cascode voltage regulator circuit of claim 21, wherein the current sense circuit comprises:

a resistor having a first resistor terminal coupled to the output terminal and a second resistor terminal;

a third transistor coupled in series between the source terminal of the drain-extended NMOS transistor and the second resistor terminal, the third transistor having a third control terminal coupled to the second gate terminal of the drain-extended PMOS transistor; and a fourth transistor coupled between the second control terminal of the second transistor and the output terminal, and having a fourth control terminal coupled to the second resistor terminal.

23. The cascode voltage regulator circuit of claim 22, wherein the first, second, and third transistors are drain-extended field effect transistors.

24. An integrated circuit comprising:

the cascode voltage regulator circuit of claim 21;

at least one sensor terminal;

at least one communications terminal; and a battery monitoring circuit coupled to the output terminal of the cascode voltage regulator circuit, to the at least one sensor terminal, and to the at least one communications terminal.

* * * * *